United States Patent
Arima

(10) Patent No.: US 7,158,665 B2
(45) Date of Patent: Jan. 2, 2007

(54) IMAGE PROCESSING DEVICE FOR STEREO IMAGE PROCESSING

(75) Inventor: Yutaka Arima, Iizuka (JP)

(73) Assignee: Exploitation of Next Generation Co., Ltd. (JP)

( * ) Notice: Subject to any disclaimer, the term of this patent is extended or adjusted under 35 U.S.C. 154(b) by 712 days.

(21) Appl. No.: 10/404,659

(22) Filed: Apr. 2, 2003

(65) Prior Publication Data

US 2003/0190073 A1  Oct. 9, 2003

(30) Foreign Application Priority Data

Apr. 3, 2002  (JP) .............................. 2002-137801

(51) Int. Cl.
*G06K 9/00* (2006.01)
(52) U.S. Cl. .................................. 382/154
(58) Field of Classification Search ............... 382/103, 382/154, 190, 209, 218, 278; 345/419–420; 348/48

See application file for complete search history.

(56) References Cited

U.S. PATENT DOCUMENTS

| | | | |
|---|---|---|---|
| 4,573,191 A * | 2/1986 | Kidode et al. .............. | 382/106 |
| 6,028,954 A * | 2/2000 | Tomita et al. .............. | 382/154 |
| 6,377,700 B1 * | 4/2002 | Mack et al. ................ | 382/154 |
| 6,606,406 B1 * | 8/2003 | Zhang et al. ............... | 382/154 |
| 6,675,040 B1 * | 1/2004 | Cosman ...................... | 600/427 |

* cited by examiner

*Primary Examiner*—Daniel Mariam
(74) *Attorney, Agent, or Firm*—Finnegan, Henderson, Farabow, Garrett & Dunner, L.L.P.

(57) ABSTRACT

In a correlation process between image patterns seen by two stereo-viewing cameras, the process can be made faster by using only the information related to a coordinate in the direction having a parallax, concerning the position of a characteristic point in the image patterns. In addition, by introducing a process for verifying the positional information of the characteristic point obtained by a camera for verification, it is possible to suppress a decrease in the characteristic information contained in the image patterns and to improve the precision of the correlation process. As a result, it is possible to achieve a stereo image processing device which operates at high speed. Further, since the stereo image processing device can be realized by a comparatively simple circuit configuration, it is expected that the device can contribute to the commercialization of in-vehicle safety monitor devices and the like.

11 Claims, 3 Drawing Sheets

IMAGE PROCESSING DEVICE FOR STEREO IMAGE PROCESSING

BACKGROUND OF THE INVENTION

1. Field of the Invention

The present invention relates to an image processing device for quickly extracting distance information from stereo images. The present invention realizes a distance extracting process with a simple circuit configuration at high speed, thereby providing an inexpensive initial visual information processing device. The art of the present invention is expected to be used for industrial products such as robot visions and in-vehicle safety monitor devices.

2. Description of the Background Art

A human's initial visual information process involves a function of extracting distance information obtained by two-eye stereo viewing in addition to a function of photosensing with high adaptability. In other words, a human's sense of sight has a function of processing image information to estimate three-dimensional information including the extent of the space from two two-dimensional patterns reflected on the retinas of both eyes. Above all, a function of instantly acquiring the distance to the target in the field of vision is one of the considerably important abilities for a human to act safely. The high-speed estimation of the distance to the target by the stereo viewing is also a considerably important image information processing technique to realize industrial products such as robot visions and in-vehicle safety monitor devices, and their commercialization has been strongly desired.

Distance (depth) estimation by stereo images is generally achieved by a correlation process for specifying the same target between two images, and a distance calculation process for calculating the distances from the two different view points on the basis of parallax information obtained from these view points.

Conventional stereo image processing devices has required a large number of time for a correlation process. This is because the amount of calculation necessary for the correlation process is huge and also because the device has a limited calculation capability. The amount of calculation necessary for the conventional stereo image correlation process is generally in proportion to the product of the third power of the number of pixels in the direction having a parallax and the number of pixels in the direction having no parallax. For example, in the case of image data consisting of about 100,000 pixels (352×288 pixels), the correlation process requires over 100 billion number of calculations. This involves the problem that even a processor with 100 GOPS (Giga Operations Per Second) could offer a process speed which does not satisfy 8 screens per second. The process speed of this level is insufficient for cars and other comparatively fast-moving devices to be put in the actual use. Therefore, it is an object of the present invention to estimate distance information from stereo images at higher speed as compared with conventional devices.

SUMMARY OF THE INVENTION

An object of the present invention is to provide an image processing device which performs a stereo image process at high speed.

An image processing device according to the present invention includes: a plurality of image capturing units, disposed in different positions from each other, outputting image data based on two-dimensional positional information, in regard to a position in the three-dimensional space detectable within the field of vision; and a verification process unit finding the correspondence relation between the positional information in the plurality of image capturing units corresponding to the identical position in the field of vision, in response to the image data from the plurality of image capturing units, and outputting the obtained results.

Preferably, the plurality of image capturing units are disposed in predetermined positions, respectively, the verification process unit includes a first memory previously storing as data the correspondence relation between the positional information in the plurality of image capturing units for each point indicated by the positional information, the correspondence relation being predetermined uniquely according to the predetermined positions, and an address to select the data outputted from the first memory is set in accordance with the image data received from the plurality of image capturing units.

Further preferably, the image processing device further includes a distance information storage unit for previously storing information indicative of the distances from the plurality of image capturing units, with respect to each point indicated by the positional information.

The distance information storage unit is constituted by a second memory previously storing information indicative of the distances from the plurality of image capturing units as data, and having the same input address as the first memory.

Preferably, the plurality of image capturing units are so disposed as to share one of the two-dimensional coordinates, and the verification process unit performs the process by using only a part related to the other one of the two-dimensional coordinates out of the image data obtained from each of the plurality of image capturing units.

Another image processing device of the present invention according to different configuration includes: a plurality of first image capturing units and at least one second image capturing unit, disposed in different positions from each other, each outputting two-dimensional image data, in regard to a position in the three-dimensional space detectable in the field of vision; and correlation process units determining the presence or absence of a characteristic point for each point in the field of vision, in response to the image data received from the plurality of first image capturing units and the at least one second image capturing unit, the correlation process units determining whether the characteristic point commonly detected by the plurality of first image capturing units is detected at a corresponding two-dimensional position of the second image capturing unit or not, and outputting the obtained results.

Preferably, the correlation process units include memory unit(s) provided corresponding to the at least one second image capturing unit, respectively, each of the memory unit(s) stores as data the presence or absence of the detection of the characteristic point in each point in the field of vision by the corresponding second image capturing unit, and an address to select the data outputted from the memory units is set in accordance with the image data received from the plurality of first image capturing units.

Further preferably, the plurality of first image capturing units and the at least one second image capturing unit are so disposed as to share one of the two-dimensional coordinates, and the correlation process units perform the process by using only a part related to the other one of the two-dimensional coordinates out of the image data obtained from the plurality of first image capturing units and the at least one second image capturing unit.

Preferably, a plurality of second image capturing units are disposed in different positions from each other.

Still another image processing device of the present invention according to still another configuration includes: a plurality of image capturing units provided in correspondence with a plurality of different view points, respectively; and a part for outputting the correspondence relation of positional information seen by the plurality of image capturing units, with respect to the characteristic points on the respective positions, concerning all positions in the three-dimensional space detectable in the field of vision.

Preferably, memory is used as the part for outputting the correspondence relation of the positional information.

Yet another image processing device of the present invention according to yet another configuration includes: a plurality of first image capturing units provided in correspondence with at least two different view points, respectively; at least one second image capturing unit provided in correspondence with at least one different viewpoint; and a part for detecting the presence or absence of the characteristic point in a position seen by the second image capturing unit, the position corresponding to positional information of the characteristic point seen by the plurality of first image capturing units.

Preferably, memory is used as the part for detecting the presence or absence of the characteristic point. It is also preferable that a plurality of different view points is provided.

Therefore, a main advantage of the present invention is to be able to perform stereo image processing at high speed because a correlation process for the specific points (characteristic points) between image patterns obtained in a plurality of image capturing units can be performed by using positional information in the respective image capturing units.

The stereo image processing can be made faster by performing a correlation process by using only the information related to the coordinate in the direction having a parallax between the plurality of image capturing units.

Recognizing the same characteristic points by using another image capturing unit for verification can realize a correlation process with high precision.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention proposes a circuit configuration for estimating distance information from stereo images at higher speed as compared with the conventional level. The present invention has a feature of performing a process by using only positional (the coordinate in the direction having a parallax) information of characteristic points in image patterns. Consequently, the amount of information to be processed in order to extract the correlation between two images constituting stereo images can be generally lessened as compared with the image information (the number of pixels in the direction having a parallax). As a result, the correlation process can be performed at high speed.

However, when image patterns are converted into the positional information of characteristic points (or information as to whether each pixel has a characteristic or not), characteristic information contained in the patterns is considerably decreased. This brings about the problem of making it impossible to specify a correct correlation by the conventional stereo image correlation processing method.

Therefore, the present invention solves this problem by introducing a process of verifying the positional information of image characteristic points by using a camera for verification. The stereo image processing device according to the present invention can achieve higher-speed processing as compared with the conventional devices and also can be constituted by a simple circuit, so that it is expected to contribute to the commercialization of in-vehicle safety monitor device and the like.

Hereinafter, embodiments of the present invention will be described in detail with reference to the drawings.

First Embodiment

Figure 1:
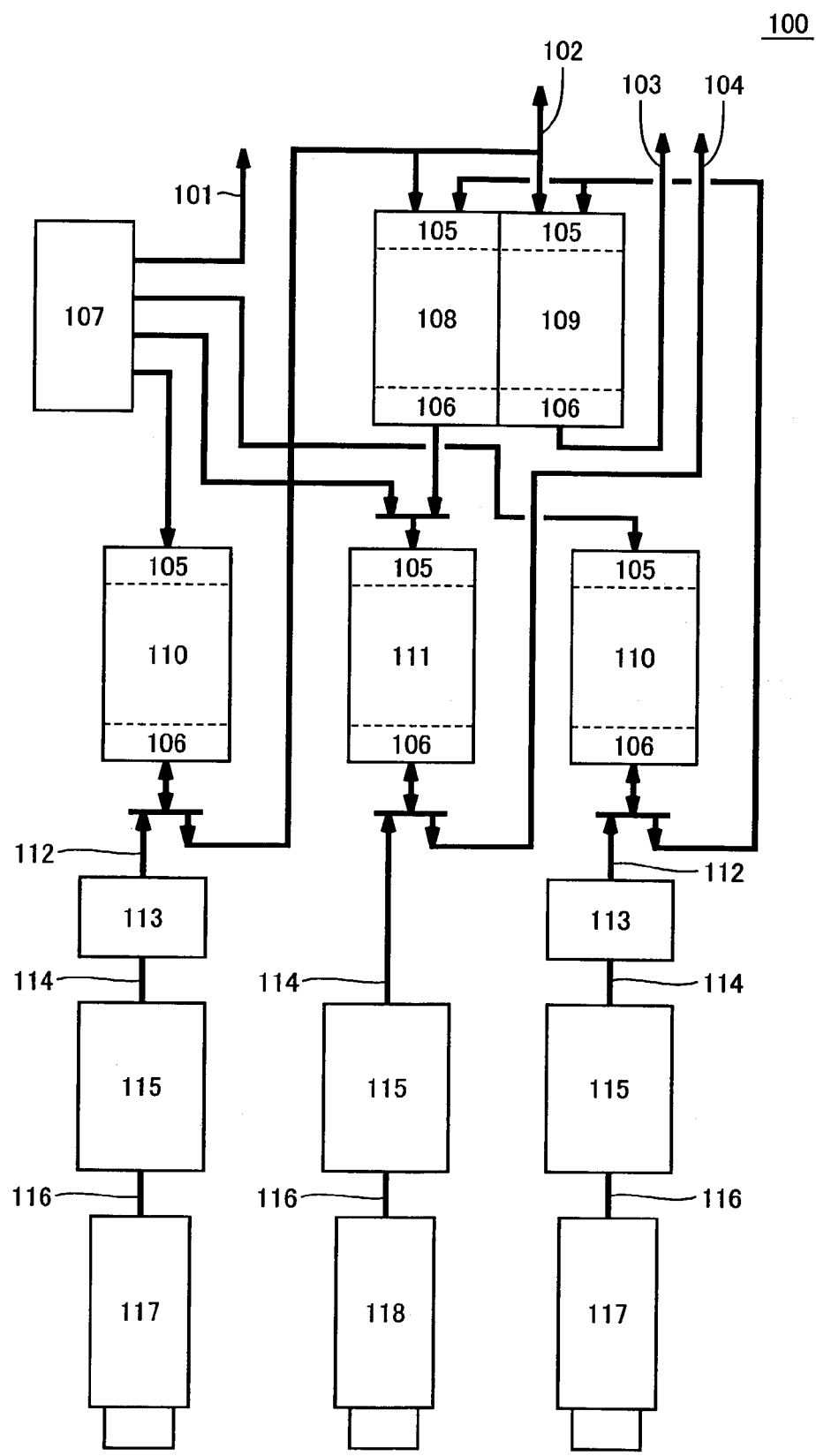
FIG. 1 is a block diagram showing the configuration example of a stereo image processing device of according to a first embodiment of the present invention.

With reference to FIG. 1, a stereo image processing device 100 according to a first embodiment of the present invention includes: a sequencer 107 for allowing an image process to perform in the predetermined procedure; a memory 108 for storing a map for verification (hereinafter, referred as "verification map memory"); a memory 109 for storing a map for distance (hereinafter, referred as "distance map memory"); two cameras 117 for stereo viewing (hereinafter, referred to as "stereo-viewing cameras"); and a camera 118 for verification (hereinafter, referred to as a "verifying camera"). Reference numerals 101 and 102 in FIG. 1 denote X-coordinate data and Y-coordinate data, respectively.

Each of stereo-viewing cameras 117 are provided with a memory 110 for storing coordinate data (hereinafter, referred as "coordinate data memory"), a coordinate conversion unit 113, and an image processing unit 115. On the other hand, verifying camera 118 is provided with a memory 111 for storing a map indicative of the presence or absence of characteristic points (hereinafter, referred to as "characteristic point map memory"), and an image processing unit 115 for extracting characteristic points.

Verification map memory 108, distance map memory 109, coordinate data memories 110, and characteristic point map memory 111 are all designed to output data 106 corresponding to an inputted address 105, respectively.

Two stereo-viewing cameras 117 and verifying camera 118 provided as image capturing units each generate image data 116 according to the image in the field of vision. Stereo-viewing cameras 117 and verifying camera 118 can be cameras of the same kind. Image processing units 115 each determine the presence or absence of characteristic points for each pixel from the image data outputted from the corresponding cameras 117 or 118 and generate data 114 indicative of the presence or absence of characteristic points showing the results of the determination. Thus, data 114 indicative of the presence or absence of characteristic points is generated for each pixel. Image processing units 115 respectively provided to stereo-viewing cameras 117 and verifying camera 118 can have the same configuration.

Coordinate conversion units 113 each convert data 114 indicative of the presence or absence of characteristic points obtained by the process for extracting characteristic points by image processing units 115 into coordinate data in the direction having a parallax, and output the converted data as coordinate data 112.

In the stereo image processing device according to the present invention, there is no limitation on the configuration of image processing units 115 which extract characteristic points from image patterns and coordinate conversion units 113 which perform coordinate conversion from data 114 indicative of the presence or absence of characteristic points into coordinate data 112. For example, it is possible to process edges or corners related to luminance in the extraction of the presence or absence characteristic points. Examples of the process for coordinate conversion include a method of writing coordinate data and data indicative of the presence or absence of characteristic points to memory as write-enable signals, and the like.

As will be described below, in the stereo image processing according to the present invention, a correlation process is unnecessary for the coordinate in the direction having no parallax, so that the correlation process for the coordinate having a parallax is repeated for each coordinate having no parallax. For example, in the case where three cameras 117 and 118 shown in FIG. 1 are arranged horizontally, that is, on the same Y coordinate, the correlation process for X-coordinate (horizontal direction) is repeated for each Y coordinate (vertical direction). Therefore, description will be given of the procedure relating to the correlation process in the direction of X coordinate in a single Y coordinate. Actually, the procedure described below is performed for all Y coordinates so as to complete a correlation process about the whole image. Assume that in the description of the present embodiment, stereo-viewing cameras 117 and verifying camera 118 are arranged horizontally and have the same Y coordinate.

The X coordinate data of the characteristic points obtained from two stereo-viewing cameras 117 is temporarily stored in the corresponding coordinate data memories 110. Data 114 indicative of the presence or absence of characteristic points obtained from verifying camera 118 is temporarily stored in the characteristic point map memory 111. Data 114 indicative of the presence or absence of characteristic points is represented as "1" when it is a characteristic point and as "0" when it is not a characteristic point. The addresses in characteristic point map memory 111 are made to correspond to the X coordinates.

After the data from cameras 117 and 118 are stored in the corresponding coordinate data memories 110 and characteristic point map memory 111, a process for specifying the correlation between the characteristic points is performed by using the characteristic-point coordinate stored in two coordinate data memories 110. Thus, the same characteristic point is specified.

In the stereo image processing according to the present invention, in order to specify correlation, all correlation combinations of characteristic points are verified to check whether they are correct or not. The data used for the verification corresponds to the data for verification stored in characteristic point map memory 111.

Thus, in coordinate data memories 110 and characteristic point map memory 111, it is necessary to perform the storage of data related to the characteristic points and a correlation-verification process. By forming each of coordinate data memories 110 and characteristic point map memory 111 into a two-bank structure, it is possible to process these operations concurrently by pipeline system, thereby increasing the speed of the stereo image process as a whole.

Next, description will be given of the principle of the correlation-verification process with reference to FIG. 2.

Assume herein that two stereo-viewing cameras 117 see characteristic points 130 to 134 indicated by five black circles in the field of vision. This means that each of stereo-viewing cameras 117 sees characteristic points 130 to 134 at the positions (X coordinate) where straight lines connecting the respective characteristic points 130 to 134 and the lens focus of each camera reach.

Consequently, the intersections (25 points) of the straight lines connecting five characteristic points 130 to 134 and the lens focus points of two stereo-viewing cameras 117 are recognized as the points where characteristic points can exist. However, it is impossible to specify the sites where the characteristic points actually exist (at least 5 sites) out of the 25 intersections because characteristic points 130 to 134 cannot be distinguished only by the images obtained from these two stereo-viewing cameras 117.

That is why the stereo image processing device according to the present invention employs verifying camera 118. Verifying camera 118 shown in FIG. 2 is supposed to see characteristic points 130 to 134 at the positions (X coordinate) where straight lines connecting the respective characteristic points and the lens focus of each camera reach. As a result, the presence or absence of the characteristic points can be determined by checking whether the characteristic points are visible in the X coordinates seen by verifying camera 118 which correspond to the respective intersections of the straight lines coming from the two stereo-viewing cameras 117.

The verification process according to the present invention, as shown in FIG. 1, makes use of verification map memory 108 in which previously-prepared information related to the map for verification correspondence is stored as data for verification. The verification map contains information indicative of the correspondence relation between the combinations of the points on X coordinates seen by two stereo-viewing cameras 117 and X coordinates seen by verifying camera 118 corresponding to the points in the space as the target. The correspondence relation, that is, the data for verification can be uniquely set in advance by predetermining the location to install cameras 117 and 118.

In other words, verification map memory 108 is so prepared in advance that if two X coordinates obtained when a certain characteristic point is seen by two stereo-viewing cameras 117 are inputted as address 105, then the X coordinates to be seen by verifying camera 118 corresponding to the two X coordinates are outputted as data 106.

In the process for verification and determination, two X coordinates are accessed as address 105 to verification map memory 108, and data 106 outputted therefrom is used as address 105 of characteristic point map memory 111. In response to this, data 106 outputted from characteristic point map memory 111 as an effective signal 104 according to which the presence or absence of characteristic points is determined.

For example, when characteristic point map memory 111 outputs data 106 having the value "1" while using the output data of verification map memory 108 as an input address, it is determined that there is a characteristic point. On the other hand, when outputted data 106 is "0", it is determined that there is no characteristic point. This verification process is repeated for all the combinations of coordinate data stored in two coordinate data memories 110.

As shown in FIG. 1, provided that the data for distance between each of stereo-viewing cameras 117 and the target is previously stored in distance map memory 109 in correspondence with the respective combinations of X coordinates seen by two stereo-viewing cameras 117, and also provided that verification map memory 108 and distance map memory 109 have the same address 105, when the correlation is determined to be correct, data 106 outputted from distance map memory 109 be treated as the data 103 for distance indicative of the estimated distance of the characteristic point. This facilitates the estimation of distance of characteristic points.

Sequencer 107 shown in FIG. 1 performs address control at the time of data storage to coordinate data memories 110 and characteristic point map memory 111, and also performs address control of coordinate data memories 110 at the time of correlation verification. Sequencer 107 can calculate the number of the repeated processes related to X coordinates and output the value as Y coordinate data 101.

Second Embodiment

Figure 2:
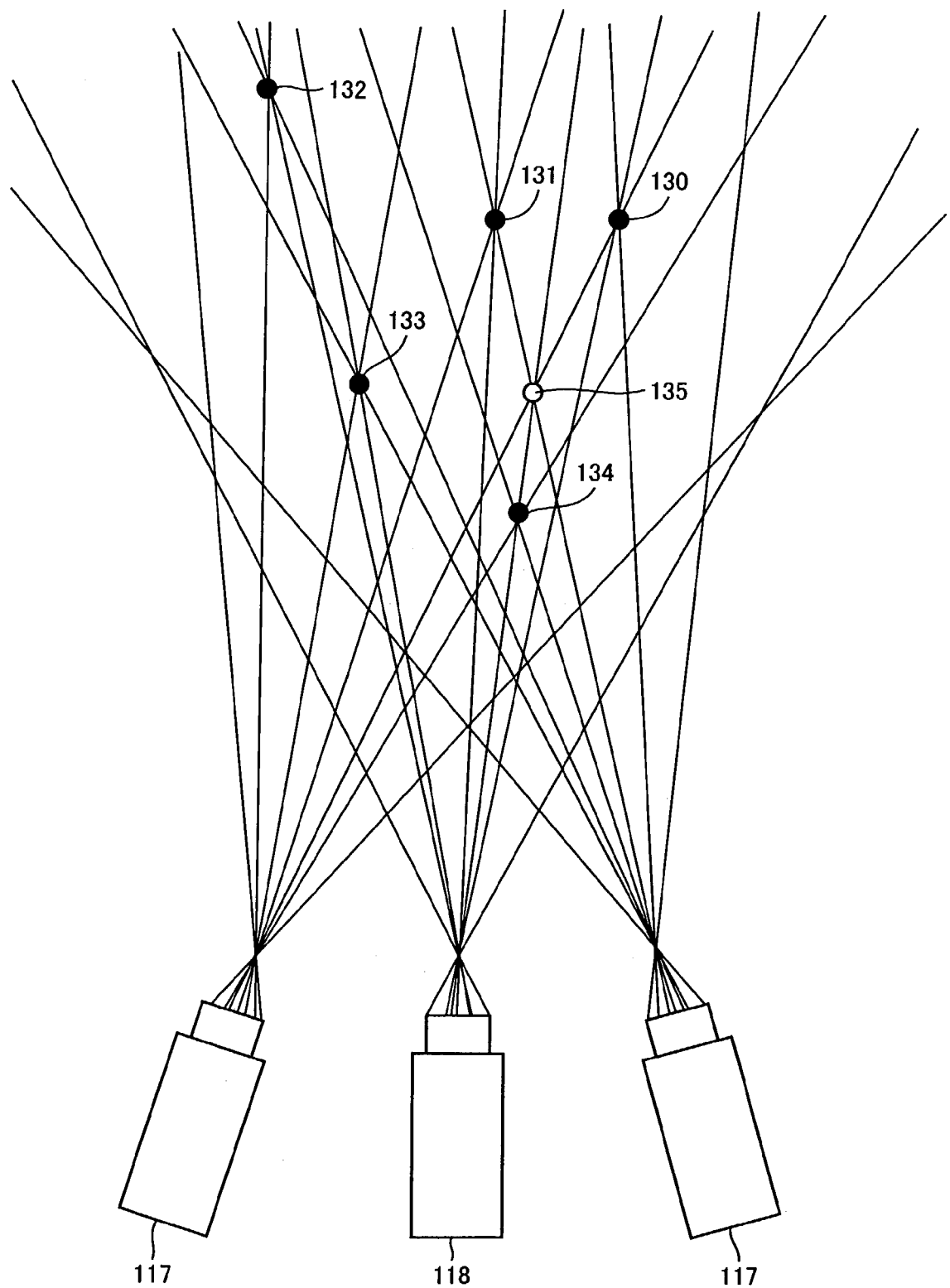
FIG. 2 is a conceptual diagram for describing the principle of a correlation-verification process in the image processing device according to the present invention.

The configuration according to the first embodiment shown in FIG. 1 has the problem that a point 135 indicated by a white circle in FIG. 2 is determined to have a characteristic point, regardless of the actual presence or absence of the characteristic point there. This is because verifying camera 118 sees point 135 and characteristic point 134 as if they were overlapped and on the same X coordinate. The problem of this kind is likely to happen when the number of the characteristic points becomes large in the field of vision.

In a second embodiment, description will be given of a stereo image processing device which avoids such an inconvenience by increasing the number of verifying cameras 118.

Figure 3:
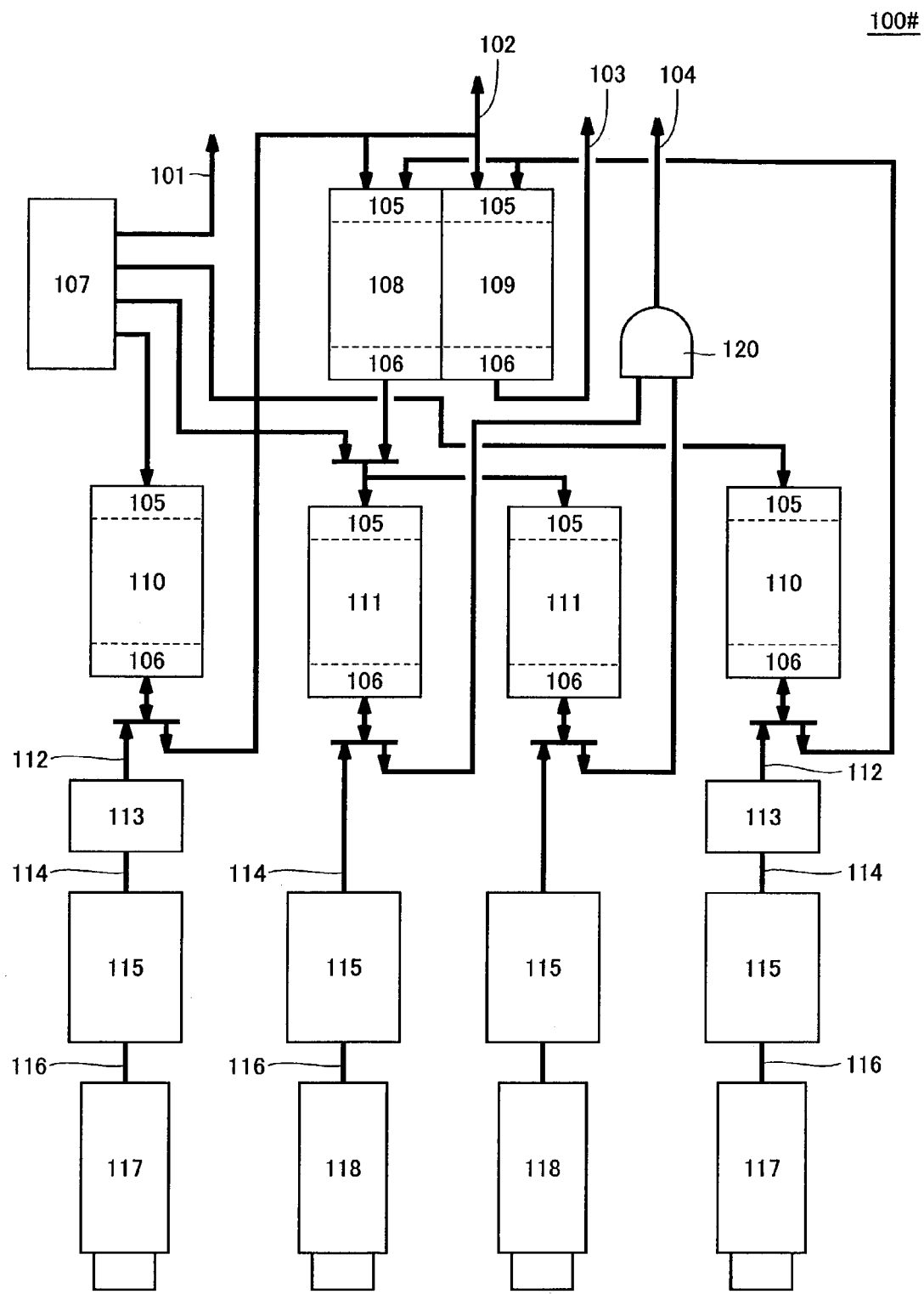
FIG. 3 is a block diagram showing the configuration example of a stereo image processing device according to a second embodiment of the present invention.

With reference to FIG. 3, a stereo image processing device 100# according to the second embodiment differs from stereo image processing device 100 according to the first embodiment in that a plurality of verifying cameras 118 are provided. Similar to the case shown in FIG. 1, image processing unit 115 for extracting characteristic points and characteristic point map memory 111 are further provided corresponding to the newly provided verifying cameras 118.

A logical circuit 120 is further provided to perform AND logical operation between the signals outputted from characteristic point map memories 111, which respectively correspond to the verifying cameras 118. The output signal of logical circuit 120 is outputted as effective signal 104.

This configuration makes it possible to secure the determination between the presence and absence of a characteristic point by the plurality of verifying cameras 118 even when the number of characteristic points becomes large in the field of vision.

As described above, the configuration according to the present invention can achieve a device for estimating distance information at high speed on the basis of the stereo images only by using some memories and a simple logical circuit. For example, in the case of image data containing about 100,000 pixels (352×288 pixels), assuming that the characteristic points in the image has an incidence of 10%, about 360,000 memory accesses can be performed for the correlation process so as to estimate the distances of all the characteristic points. As an example, when a memory with access time of 20 ms is used, processing one stereo image requires about 7 ms, so 140 screens can be processed per second. If the incidence of characteristic points is 5%, then 560 screens can be processed per second. In that case, memories 110 for storing coordinate data require a capacity of about 320 bytes; memories 111 for storing a map indicative of the presence or absence of characteristic points require a capacity of about 352 bytes; and each of verification map memory 108 and distance map memory 109 requires about 1.2 mega bytes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:
a plurality of image capturing units, disposed in different positions from each other, outputting image data based on two-dimensional positional information, in regard to a position in three-dimensional space detectable within the field of vision; and
a verification process unit finding a correspondence relation between said positional information in said plurality of image capturing units corresponding to an identical position in said field of vision, in response to said image data received from said plurality of image capturing units, and outputting the obtained results,
wherein,
said verification process unit includes a first memory previously storing as data the correspondence relation between said positional information in said plurality of image capturing units for each point indicated by said positional information, the correspondence relation being predetermined uniquely according to said predetermined positions, and
an address to select said data outputted from said first memory is set in accordance with said image data received from said plurality of image capturing units.

2. The image processing device according to claim 1, wherein
said plurality of image capturing units are disposed in predetermined positions, respectively.

3. The image processing device according to claim 2, further comprising
a distance information storage unit for previously storing information indicative of the distances from said plurality of image capturing units, with respect to said each point indicated by said positional information.

4. The image processing device according to claim 3, wherein
said distance information storage unit is constituted by a second memory previously storing information indicative of the distances from said plurality of image capturing units as data, and having the same input address as said first memory.

5. The image processing device according to claim 1, wherein
said plurality of image capturing units are so disposed as to share one of said two-dimensional coordinates, and
said verification process unit performs the process by using only a part related to the other one of said two-dimensional coordinates out of said image data obtained from each of said plurality of image capturing units.

6. An image processing device comprising:
a plurality of first image capturing units and at least one second image capturing unit, disposed in different positions from each other, each outputting two-dimensional image data, in regard to a position in three-dimensional space detectable in the field of vision; and correlation process units determining the presence or absence of a characteristic point for each point in said field of vision, in response to said image data received from said plurality of first image capturing units and said at least one second image capturing unit, wherein said correlation process units determine whether said characteristic point commonly detected by said plurality of first image capturing units is detected at a corresponding two-dimensional position of said second image capturing unit or not, and output the obtained results, wherein, said correlation process units include memory unit(s) provided corresponding to said at least one second image capturing unit, respectively;

each of said memory unit(s) stores as data the presence or absence of the detection of said characteristic point in each point in said field of vision by the corresponding second image capturing unit, and an address to select said data outputted from said memory units is set in accordance with said image data received from said plurality of first image capturing units.

7. The image processing device according to claim 6, wherein said plurality of first image capturing units and said at least one second image capturing unit are so disposed as to share one of said two-dimensional coordinates, and said correlation process units perform the process by using only a part related to the other one of said two-dimensional coordinates out of said image data obtained from said plurality of first image capturing units and said at least one second image capturing unit.

8. The image processing device according to claim 6, wherein a plurality of said second image capturing units are disposed in different positions from each other.

9. An image processing device comprising:

a plurality of image capturing units provided in correspondence with a plurality of different view points, respectively; and means for outputting a correspondence relation of positional information seen by said plurality of image capturing units, with respect to characteristic points on respective positions, concerning all positions in three-dimensional space detectable in the field of vision, wherein, said means for outputting a correspondence relation of positional information includes a memory previously storing as data the correspondence relation between said positional information in said plurality of image capturing units for each point indicated by said positional information, the correspondence relation being predetermined uniquely according to said predetermined positions, and an address to select said data outputted from said memory is set in accordance with said image data received from said plurality of image capturing units.

10. An image processing device comprising:

a plurality of first image capturing units provided in correspondence with at least two different view points;

at least one second image capturing unit provided in correspondence with at least one different viewpoint; and means for detecting the presence or absence of a characteristic point in a position seen by said second image capturing unit, said position corresponding to positional information of said characteristic point seen by said plurality of first image capturing units, wherein said means for detecting the presence or absence of a characteristic point includes a memory previously storing as data the correspondence relation between said positional information in said plurality of first image capturing units and said at least one second image capturing unit for each point indicated by said positional information, the correspondence relation being predetermined uniquely according to said predetermined positions, and an address to select said data outputted from said memory is set in accordance with said image data received from said plurality of image capturing units.

11. The image processing device according to claim 10, wherein a plurality of said different view points are provided.

* * * * *